3,008,819
PROCESS FOR MELTING ORES, METALS, GLASS, MINERALS AND SIMILAR FUSIBLE MATERIALS IN A FURNACE
Alois Schmid, 46 Gregor Mendelstrasse, Vienna, Austria, and Hermann Hofer, Wopfing, Lower-Austria, Austria
Filed Aug. 25, 1959, Ser. No. 835,980
Claims priority, application Austria Oct. 2, 1958
3 Claims. (Cl. 75—43)

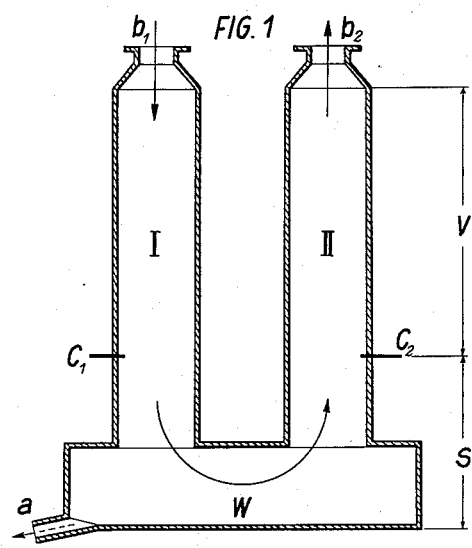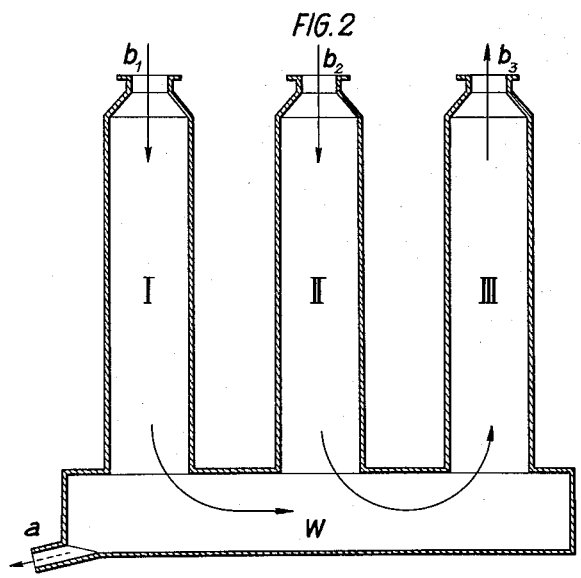

This invention relates to a process and a shaft furnace for melting fusible materials. This term is used herein to denote and include ores, metals, minerals and other fusible materials.

It is an object of the present invention to attain improved efficiency of the amount of heat introduced into the melting process and device in comparison with melting processes and devices known from the art. In carrying out this invention a furnace is used, which comprises at least two shafts. The material to be melted is introduced into the shafts, and is first preheated and then exposed to direct contact with a suitable fuel.

In carrying out the invention it is essential that fresh air and fuel are passed in a first operating period in at least one shaft in downward direction in direct current and are passed through a connecting part of the furnace, e.g. a smelting chamber connecting the two shafts, to at least one other shaft and leave the latter in upward direction in counter current as waste gas, whereupon in the subsequent operating periods operation of the shafts is switched in a cycle.

The process and the device of this invention are not limited to a specific number of shafts. For example, three shafts, which are preferably connected by a common melting chamber, can be used. In this case, during a first operating period air is passed through the first shaft and a combustible gas is passed through a second shaft in downward direction and simultaneously, the waste gases formed leave the furnace in upward direction through the third shaft. In the subsequent operating periods, the shafts in which air, combustible gas or waste gas pass, are switched in a cycle. This specific embodiment of the invention has been found to be particuarly suitable for the use of low-grade fuel gas, e.g. blast-furnace gas.

The appended drawings illustrate some specific embodiments of and best molds for carrying out the invention to which the invention is not limited.

Figure 3:
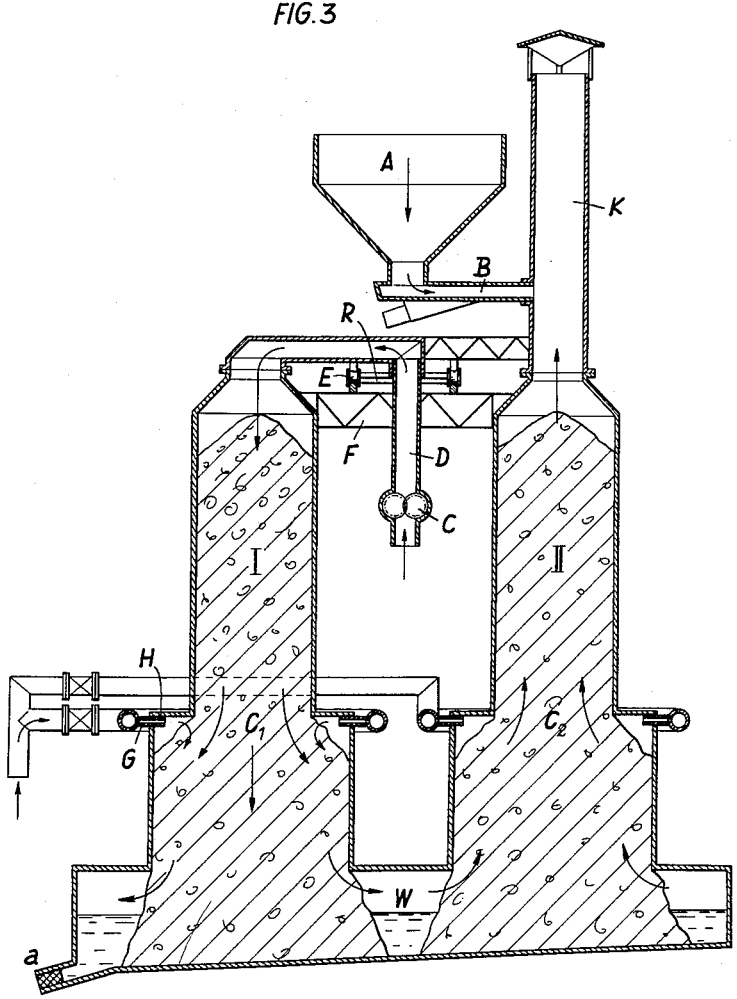
Figure 4:
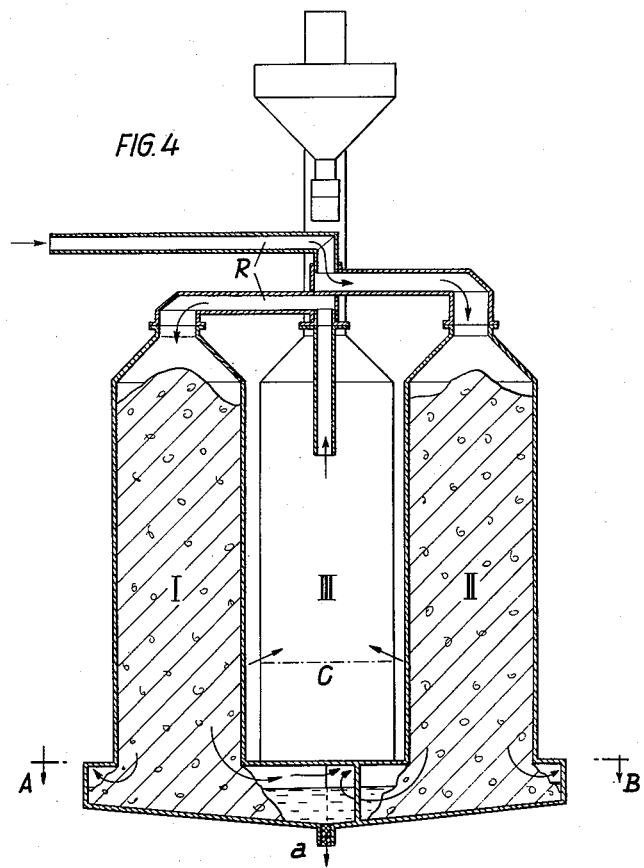
Figure 5:

In the drawings:
FIG. 1 diagrammatically illustrates a melting furnace containing two shafts;
FIG. 2 in a similar illustration of a melting furnace containing three shafts, for operation with a low-grade fuel gas, e.g. blast-furnace gas;
FIG. 3 diagrammatically illustrates some more details of a furnace of the type shown in FIG. 1;
FIG. 4 illustrates some more details of a furnace of the type shown in FIG. 2, diagrammatically and in sectional view, and
FIG. 5 diagrammatically illustrates a section of the furnace shown in FIG. 4 along the line A—B.

Referring now to the drawings in detail, the furnace illustrated in FIG. 1 consists of two shafts I and II which are arranged side by side and connected by a common melting chamber W. However, each of the shafts may also have its own melting hearth above which the shaft is arranged and a connecting channel may be arranged between the shafts.

Each of the two shafts I and II is provided at the top with an inlet opening $b_1$, $b_2$ for the introduction of air and material to be melted and for the discharge of waste gases. In the lower third of the shaft they have an inlet $c_1$, $c_2$ for the fuel which may be powdered, liquid or gaseous. The zone between the inlets $b_1$, $b_2$ for air and material to be treated and the inlets $c_1$, $c_2$ for the fuel, can be denoted the preheating zone V and the zone below the fuel inlets $c_1$, $c_2$ can be denoted the melting zone.

Such a furnace is operated in the following manner. During a first operating period, fresh air is introduced through inlet $b_1$ into shaft I and is heated by preheated material in said shaft I approximately to melting temperature. In the space between $c_1$ and $c_2$—i.e. where the material is still in the shafts or is in the melting chamber W—burners are arranged at desired points and bring about melting of the material treated with utilization of the preheated air. The waste gases are cooled in shaft II up to the melting temperature of the material to be treated and preheat such material in the range between $c_2$ and $b_2$. Thus, heat is accumulated in the material located in preheating zone V of shaft II in such an amount that this material, which is heated almost to melting temperature, preheats the fresh air introduced in the subsequent second operating period through $b_2$ into shaft II. In this second period, the melting process takes place in the same manner as in the first period, except that the waste gases leave shaft I through $b_1$.

The molten material is discharged at $a$. Switching from one operating period to the other should be always carried out when the temperature of the escaping waste gases starts to exceed a certain temperature. It is preferred to effect switching from one operating period to the other in as short intervals as feasible in view of the melting procedure. It will be understood that the storage of heat in the preheating zone and the subsequent utilization of the stored heat for preheating the fresh air, result in favorable utilization of the heat supplied to the furnace.

FIG. 2 illustrates a three-part shaft furnace, in which a low-grade gaseous fuel, e.g. blast-furnace gas is used. In such furnaces it is necessary to preheat the fresh air as well as the fuel gas in order to obtain high melting temperatures. In operating such furnace, air and fuel gas is supplied in a cycle to shafts I–III, which are arranged above a common melting chamber. While the cold air enters shaft I through $b_1$ and the likewise cold fuel gas enters shaft II through $b_2$, the waste gases leave the furnace in this operating period through shaft III at $b_3$. In the subsequent operating period, the air enters through shaft II, the fuel gas through shaft III and the air as well as the fuel gas are preheated during their passage through the shaft. Thus, melting takes place in the range of the melting chamber and in the lower range of the third shaft, i.e. shaft I, in this example, and the material freshly supplied to shaft I is thereby heated by the upward passing waste gases to almost melting temperature.

It will be understood that more than three shafts can be arranged above a common melting chamber and operated in a manner substantially analogous to that described above.

In the third operating period, the melting procedure is continued, and in this period the waste gases leave the furnace through shaft II, into which fresh material to be treated is also introduced.

In using three shafts in combination with a common melting chamber, it is preferred to arrange the shaft symmetrically in a triangle so that the melting conditions are approximately equal in all operating periods.

The furnace illustrated in FIG. 3 consists of two shafts I and II, which are connected with each other by a common melting chamber W. Above the top of the furnace, a rotating mechanism R is arranged, which is turned by 180° at each switch of the operating periods. In the middle a stationary feeding bin A is arranged, from which an oscillating bin outlet B leads to the mouth of that shaft, in which—at that time—no melting is carried out and from which the waste gases escape in upward direction then through the chimney K. The air is introduced by means of a blast device C over a tube D into the shaft, in which melting is effected in the respective period of operation. This shaft contains then material to be melted which has already been preheated by waste gases in the preceding operating period. The rotating mechanism R is turned by a suitable motor and for this purpose rollers E moving on rails of a bridge F are provided for.

The burners are arranged at $c_1$, $c_2$, and may be oil burners, pulverized-coal burners or gas burners. The gas burners may consist of an annular tube G, from which a number of nozzles H open into the shaft. The common melting chamber W has a discharge opening at $a$.

The furnace illustrated in FIG. 4 is operated substantially in the manner described above in connection with FIG. 2. Feed of the material to be melted is carried out in batches discontinuously and switching from one operation period to the other may take place e.g. every 10 minutes.

FIG. 4 and FIG. 5 illustrate some details of a triplet furnace of the type shown in FIG. 2. This furnace consists of three shafts I, II and III and is operated with gaseous fuel only, preferably a low-grade gaseous fuel. This furnace is provided with a rotating mechanism R, which serves for feeding air, fuel gas and material to be melted in a cycle in the manner described above in connection with FIG. 3. The air which is heated in shaft I by hot material to be melted, mixes at H with the likewise heated fuel gas (e.g. blast-furnace gas or generator gas) which has passed downward through shaft II, and is burnt in shaft III then. Additional air is preferably added at $c$ and escapes in upward direction, whereby the material in shaft III is preheated. Feeding of the furnace is carried out discontinuously, and the molten material is discharged from time to time, without the discharge being particularly dependent on the feed of material to the furnace.

In carrying out this invention, for example iron ore, copper ore, tin ore, zinc ore, lead ore, can be melted. Furthermore, the invention can be used for melting crude iron, scrap iron (cast-iron scrap or steel scrap), minerals, glass and blast-furnace slag. Sheet iron scrap can be treated in the form of piles.

*Example*

In a furnace of the type shown in FIG. 3, e.g. in a cupola furnace of this type, 4.2 tons of the starting material, consisting of 2 tons of cast-iron scrap, and 2.2 tons of hematite iron pig, are introduced together with conventional admixtures, such as lime and alloy ingredients. This material is fed in intervals of 10 minutes in portions of 700 kg. through the oscillating bin discharge into one of the shafts of the furnace. To the other shaft generator gas is supplied, using for each charge of said 4.2 tons, 26.8 m.$^3$ having a calorific value of 9500 kcal./m.$^3$. By blast device C, 536 m.$^3$ of air are blown in and this air has a temperature of 1200° C. when it meets the fuel gas. The heat supplied serves for melting and for compensation of unavoidable losses by radiation and waste gases. The molten cast iron is discharged from the melting chamber at $a$, while the waste gases (which consist substantially of $CO_2$, $H_2O$, $N_2$ and $O_2$) leave the furnace through the second shaft with a temperature of about 80° C. after the material in this shaft has been heated to about 1200° C. The amount of waste gases per charge is about 350 m.$^3$.

It will be understood that this invention is not limited to the steps, conditions, constructions and designs specifically described above and illustrated in the drawings and can be carried out with various modifications without departing from the scope of the invention as defined in the appended claims.

What is claimed is:

1. A process for melting ores, metals, glass, minerals and fusible materials in a furnace consisting of at least two shafts for the material to be melted and a common melting chamber for said shafts, comprising preheating by burnt gases in each of the shafts the material to be melted and directly contacting said material, after said preheating, with fuel introduced by itself into the respective shaft, passing fresh air to be preheated and fuel to be burned with the preheated air during a first operating period in at least one shaft in downward direction in direct current relative to preheated material to be melted, burning the fuel, and then passing the burnt gases through the common melting chamber to at least one of the other shafts whereat they escape through the latter in upward direction in countercurrent through material to be preheated and melted, and reversing the process through the shafts in subsequent operations in a cycle.

2. A process as claimed in claim 1, in which burning of the fuel is started in the shaft through which the fuel is passed in direct current.

3. A process as claimed in claim 1, in which a furnace consisting of at least three shafts is used and during a first operating period air is passed in downward direction through a first shaft; a combustible gas is passed in downward direction through a second shaft and waste gases are passed in upward direction through a third shaft and in subsequent operating periods the shafts passed by air, combustible gas and waste gas are switched in a cycle.

References Cited in the file of this patent

UNITED STATES PATENTS

| | | |
|---|---|---|
| 2,040,650 | Frankl | May 12, 1936 |
| 2,040,651 | Frankl | May 12, 1936 |